United States Patent [19]

Kawabata et al.

[11] Patent Number: 5,344,891
[45] Date of Patent: Sep. 6, 1994

[54] BIODEGRADABLE POLYMERS

[75] Inventors: Nariyoshi Kawabata, Osaka; Mutsumi Kohsaka, Moriyama; Teruya Kurooka, Fujiidera, all of Japan

[73] Assignee: Mitsubishi Rayon Co., Ltd., Tokyo, Japan

[21] Appl. No.: 1,775

[22] Filed: Jan. 8, 1993

Related U.S. Application Data

[63] Continuation-in-part of Ser. No. 726,223, Jul. 5, 1991, abandoned.

[30] Foreign Application Priority Data

Jul. 7, 1990 [JP] Japan .................. 2-178516

[51] Int. Cl.$^5$ .............................. C08F 8/40
[52] U.S. Cl. .................. 525/327.1; 525/340; 525/343; 525/353; 525/359.1; 525/359.6
[58] Field of Search ............... 525/327.1; 526/265

[56] References Cited

U.S. PATENT DOCUMENTS

| | | | |
|---|---|---|---|
| 4,222,881 | 9/1980 | Byham et al. | 526/265 |
| 4,452,878 | 6/1984 | Locatell, Jr. et al. | 526/265 |
| 4,456,678 | 6/1984 | Lee et al. | 526/265 |
| 4,927,887 | 5/1990 | Tate et al. | 525/327.1 |
| 5,185,415 | 2/1993 | Kawabata et al. | 526/265 |

OTHER PUBLICATIONS

"Polymer Preprints, Japan," vol. 41, No. 3 (1992), p. 1076.
"Polymer Preprints, Japan," vol. 41, No. 3 (1992), pp. 1-3 English Translation.
"Polymer Preprints, Japan," vol. 41. No. 6 (1992), pp. 2192-2194.
"Polymer Preprints, Japan," vol. 41, No. 6 (1992), pp. 1-9 English Translation.

*Primary Examiner*—Bernard Lipman
*Attorney, Agent, or Firm*—Oblon, Spivak, McClelland, Maier & Neustadt

[57] ABSTRACT

Provided are biodegradable polymers each of which can be obtained by introducing pyridinium groups such as N-alkylpyridinium groups or N-arylpyridinium groups into a backbone of a synthetic polymer of a vinyl compound or olefin and then quaternizing the pyridinium groups with counter anions such as chlorine ions or bromine ions. The biodegradable polymers have high compatibility with microbial cells so that articles molded or otherwise formed from the biodegradable polymers can be easily decomposed by activated sludge or under conditions buried in the ground.

5 Claims, No Drawings

BIODEGRADABLE POLYMERS

This is a continuation-in-part of copending application Ser. No. 07/726,223 filed Jul. 5, 1991, now abandoned.

BACKGROUND OF THE INVENTION a) Field of the Invention

The present invention relates to biodegradable polymers, and more specifically to biodegradable polymers with N-substituted pyridinium groups introduced therein.

b) Description of the Prior Art

Synthetic polymers are abundantly used in the form of molded articles, fibers, sheets, films and the like both for industrial and domestic applications. It is however the current situation that many of these synthetic polymers are disposed of as they are without any special treatment. In general, synthetic polymers decompose very little, so that when thrown away as they are, they are not readily decomposed and tend to induce environmental contamination, leading to a worldwide social problem.

As a fundamental solution to this problem, the effectiveness of impartment of biodegradability to synthetic polymers is easily inferable. One known example of such an attempt includes composite materials made of starch and synthetic polymers. When this approach is followed, the composite materials are decomposed at the sites of the starch because the starch is biodegradable. It is hence necessary to treat the remaining segments only. The above approach has however provided absolutely no improvement to the inherent defect of synthetic polymers that they lack biodegradability. The desirability to develop a more biodegradable product remains therefore an important issue.

OBJECTS AND SUMMARY OF THE INVENTION

An object of the present invention is to provide a biodegradable polymer.

Another object of the present invention is to provide a method for converting a hardly biodegradable synthetic polymer to a readily biodegradable one by increasing the compatibility between a microorganism and the former synthetic polymer.

The above-described objects of the present invention can be achieved by the provision of a biodegradable polymer, which is composed of a synthetic polymer containing, as predominant recurring units, units of a monomer selected from vinyl compounds and olefins. A backbone of the biodegradable polymer comprises 0.5–10 mole % based on the biodegradable polymer, of effective units each of which is effective for biodegradability and comprises recurring units, said recurring units being formed of plural units of the monomer, and an N-substituted pyridinium group bonded directly with the recurring units of the plural units of the monomer and selected from the group consisting of N-alkylpyridinium groups, N-arylpyridinium groups and N-arylalkylpyridinium groups.

Biodegradable polymers each of which can be provided by the present invention and contains N-substituted pyridinium groups introduced in a backbone of a synthetic polymer are believed to undergo biodegradation at the sites of the N-substituted pyridinium groups, probably owing to their high compatibility with microbial cells. Molded or otherwise formed articles can therefore be biodegraded, resulting in destruction of the shapes of the molded or otherwise formed articles. The biodegradable polymers according to the present invention are therefore extremely useful for the maintenance of the environment.

DETAILED DESCRIPTION OF THE INVENTION

Illustrative examples of N-substituted pyridinium groups to be introduced into a backbone of a synthetic polymer upon production of a biodegradable polymer of the present invention include N-alkylpyridinium groups, N-arylpyridinium groups, and N-arylalkylpyridinium groups. Exemplary counter anions for such N-substituted pyridinium groups include chlorine ions, bromine ions, nitrate anions, nitrite anions, phosphate anions, sulfate anions, sulfite anions, and sulfonate anions.

The synthetic polymer which makes up the biodegradable polymer of the present invention is, for example, a high-molecular material which permits introduction of N-alkylpyridinium, N-arylpyridinium or N-arylalkylpyridinium groups in the backbone thereof by a method to be described subsequently and which contains, as predominant recurring units, units of a monomer selected from vinyl compounds and olefins. Examples of the vinyl compounds include those represented by $CH_2=CXY$, whereas examples of the olefins include those represented by $CXY=CZW$.

Here, examples of X, Y, Z and W include hydrogen atoms; alkyl, allyl, aralkyl, aryl, arylalkyl, alkenyl, alkinyl, cyano, alkoxyl, carboalkoxyl, alkoxycarbonyl and acyl groups; and fluorine, chlorine, iodine and bromine atoms. Preferred are synthetic polymers formed principally of homopolymers of these monomers, namely, those composed of recurring units represented by one of the following formulae:

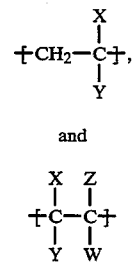

as well as those composed primarily of copolymers of such monomers.

Incidentally, diolefins may undergo crosslinking during polymerization or post-treatment. In the case of a synthetic polymer obtained using a diolefin as a starting raw material and having a complex crosslinked structure, it is therefore difficult to impart biodegradability even when N-substituted pyridinium groups are introduced therein.

Preferred specific examples of the synthetic polymer which makes up the biodegradable polymer according to the present invention include homopolymers and copolymers of methacrylic acid and methacrylate esters such as methyl methacrylate and 2-hydroxyethyl methacrylate; homopolymer and copolymers of acrylic acid and acrylate esters; and homopolymers and copolymers of acrylonitrile, styrerie, acrylamide and vinyl chloride.

Among these, polymethyl methacrylate, polyacrylonitrile and polystyrene are preferred. polyacrylonitrile and polystyrene are preferred.

Formula [1] represents units which are effective for biodegradability and constitute the biodegradable polymer of the present invention having high compatibility with microorganisms.

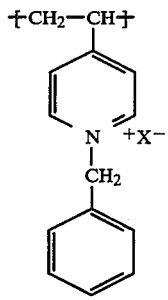

[1]

wherein $X^-$ represents a chlorine or bromine ion or a nitrate, nitrite, phosphate, sulfate, sulfite or sulfonate anion.

Particularly preferred is the recurring units represented by the formula [1] in which $X^-$ is a chlorine ion, namely, poly-N-benzyl-4-vinylpyridinium chloride represented by the following formula [2]:

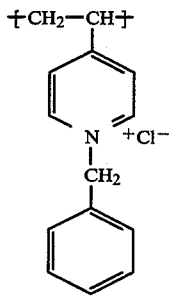

[2]

Preferably, the introduction of recurring units the backbone of a synthetic polymer can be achieved, for example, by subjecting methyl methacrylate and 2-vinylpyridine or 4-vinylpyridine to radical copolymerization and then reacting the resultant copolymer with benzyl chloride in an amount equimolar to the vinylpyridine so that the units effective for biodegradability account for 0.5-10 mole % based on the biodegradable polymer.

As is understood from the foregoing, any monomer or monomers copolymerizable with 2- or 4-vinylpyridine can be used as recurring units which make up the backbone of a synthetic polymer. In the present invention, it is therefore possible to form the backbone of a synthetic polymer by using a monomer copolymerizable with 2-vinylpyridine or 4-vinylpyridine, for example, methyl methacrylate and another monomer copolymerizable with methyl methacrylate.

As another preferred process, 2-vinylpyridine or 4-vinylpyridine is reacted, for example, with benzyl chloride to obtain N-benzyl-2-vinylpyridine or N-benzyl-4-vinylpyridine monomer. The monomer is then subjected to radical copolymerization, for example, with methyl methacrylate or acrylonitrile so that units effective for biodegradability amount to 0.5-10 mole % based on the biodegradable polymer.

A preferred biodegradable polymer can therefore be obtained by polymerizing a vinyl monomer, which is represented by the following formula [3]:

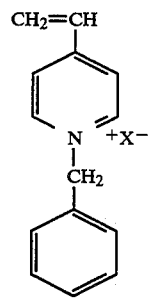

[3]

wherein $X^-$ represents a chlorine or bromine ion or a nitrate, nitrite, phosphate, sulfate, sulfite or sulfonate anion,
with a vinyl compound or olefin so that units effective for biodegradability account for 0.5-10 mole % based on the biodegradable polymer.

Further, synthetic polymers containing N-substituted pyridinium groups can be modified to other derivatives by subjecting their side chains to a chemical reaction, for example, by hydrolyzing alkoxycarbonyl groups of a polyacrylate ester into carboxyl groups or nitrile groups of acrylonitrile homopolymer into amido groups and carbonyl groups.

The introduction rate of N-substituted pyridinium groups in the backbone of a synthetic polymer is of the nature that can be designed depending on the application purpose such as the degradability desired for the biodegradable polymer or in accordance with the application form, namely, depending on whether it is used in the form of a molded or extruded article, fibers, a sheet or a film or in any other form. The introduction rate of N-substituted pyridinium groups cannot therefore be determined in any wholesale manner. In general, the introduction rate of N-substituted pyridinium groups may however be in the range of 0.5-10 mole %, preferably in the range of 1-5 mole % per mole of all the monomers copolymerized. Introduction rates lower than 0.5 mole % are too little to effectively impart biodegradability. On the other hand, introduction rates higher than 10 mole % are not preferred since the resultant polymers tend to show antifungal properties.

Production of such a synthetic polymer can be conducted by applying any conventional process which is widely used upon polymerization of vinyl compounds or olefins. It is only necessary to add about 0.5-10 mole of 2-vinylpyridine or 4-vinylpyridine to the monomer prior to its polymerization.

To produce a synthetic polymer, for example, by copolymerization with methyl methacrylate, it is possible, as in the conventional polymerization processes for methyl methacrylate, to use a bulk, suspension, solution or emulsion polymerization process in the presence of a radical polymerization initiator such as benzoyl peroxide, lauroyl peroxide or azobisisobutyronitrile, one of various ionic polymerization initiators or an organometal compound such as a transition metal complex.

Taking methyl methacrylate as an example, the polymerization process will be described in detail. In a 500-ml, three-neck flask equipped with a reflux condenser, a bladed stirring rod and a nitrogen inlet tube, 100 g of toluene, 99 g of methyl methacrylate, 1 g of 4-vinylpyridine and 0.3 g of azobisisobutyronitrile are placed. Polymerization can then be conducted by simply heating and stirring them at 80° C. for 6 hours in a nitrogen atmosphere. When the reaction mixture is poured into methanol after completion of the polymerization reaction, a polymer is allowed to precipitate. It is then only necessary to collect and dry the precipitate.

As a method for quaternizing, into N-substituted pyridinium groups, pyridyl groups of a synthetic polymer obtained by copolymerization with 2-vinylpyridine or 4-vinylpyridine, it is only necessary to react, for example, benzyl chloride with pyridyl groups in an equimolar amount. A description will be made, taking the case of polymethyl methacrylate as an example. Benzyl chloride in an amount equimolar to vinylpyridine is added to the reaction mixture of the above-described polymerization or to a toluene solution of the polymer obtained in a dry form, followed by heating and stirring at 80° C. for 4 hours. When the contents are added to methanol after completion of the reaction, polymethyl methacrylate containing N-substituted pyridinium groups is caused to precipitate. It is then only necessary to collect and dry the precipitate.

Formation of biodegradable polymers of the present invention, which are obtained by the process described above, into articles of various shapes can be conducted by using conventional molding or forming methods as they are.

Microbial selectivity of biodegradable polymers according to this invention has not been fully investigated. Their biodegradability can however be easily ascertained under conditions immersed in a conventional activated sludge aeration tank employed in a sewage treatment plant or under conditions buried in the ground. Namely, they can be confirmed, for example, by immersing molded articles for a predetermined number of days in an activated sludge aeration tank, measuring the molecular weights of the biodegradable polymers and then comparing them with their corresponding molecular weights before the immersion.

EXAMPLE 1

A 500-ml, three-neck flask equipped with a reflux condenser, a bladed stirring rod and a nitrogen inlet tube was charged with a predetermined amount of toluene in advance. In a nitrogen atmosphere, a monomer mixture of the composition shown in Table 1 and 20 mmol (0.33 g) of azobisisobutyronitrile as a polymerization initiator were added. Polymerization was then conducted at the oil bath temperature of 90° C. for 6 hours in the case of the methyl methacrylate polymer and at the oil bath temperature of 95° C. for 10 hours in the case of the styrene polymer.

TABLE 1

|  | Sample No. | Methyl methacyrlate (g) | 4-Vinylpyridine (g) | Toluene (g) |
| --- | --- | --- | --- | --- |
| Methyl | A-1 | 100.00 | — | 100.00 |

TABLE 1-continued

|  | Sample No. | Methyl methacyrlate (g) | 4-Vinylpyridine (g) | Toluene (g) |
| --- | --- | --- | --- | --- |
| methacrylate | A-2 | 98.90 | 1.10 | 100.00 |
| polymer | A-3 | 96.70 | 3.30 | 100.00 |
|  | A-4 | 94.50 | 5.50 | 100.00 |
| Styrene | B-1 | 104.00 | — | 125.00 |
| polymer | B-2 | 102.96 | 1.04 | 125.00 |
|  | B-3 | 100.88 | 3.12 | 125.00 |
|  | B-4 | 98.80 | 5.20 | 100.00 |

On the day following the polymerization, each of the polymers was added with benzyl chloride in an amount equimolar to 4-vinylpyridine. Benzyl chloride was then reacted under stirring in a nitrogen atmosphere at the oil bath temperature of 80° C. for 4 hours in the case of the methyl methacrylate polymers (Sample Nos. A-2, A-3 and A-4) and for 6 hours in the case of the styrene polymer (Sample Nos. B-1, B-2, B-3 and B-4). After completion of the reaction, the resulting biodegradable polymers were transferred to separate 300-ml Erlenmeyer flasks. The flasks were hermetically sealed to store the biodegradable polymers therein.

For the sake of comparison, homopolymer of methyl methacrylate (Sample No. A-1) was produced under the same conditions except for the omission of 4-vinylpyridine.

The methyl methacrylate polymers and homopolymer described above were formed into sheets of 1 cm in width, 2 cm in length and 0.5 mm in thickness by a casting process, respectively. To investigate their biodegradability, they were immersed in an activated sludge aeration tank of a sewage treatment plant in accordance with the schedule shown in Table 2.

To determine the biodegradability of the methyl methacrylate polymers and homopolymer in terms of the degree of a reduction in molecular weight, the intrinsic viscosities $[\eta]$ of the immersed sheets were measured at 30° C. in toluene and their viscosity-average molecular weights were then determined in accordance with the following formula:

$$\text{Viscosity-average molecular weight } M = \left[ \frac{[\eta]}{K} \right]^{1/a}$$

where $K = 7.0 \times 10^{-3}$ and $a = 0.71$ were used as constants.

Table 2 shows the viscosity-average molecular weights of sheets, which had been made from the methyl methacrylate homopolymer (Sample No. A-1) containing no N-substituted pyridinium groups and from the methyl methacrylate polymers (Sample Nos. A-2, A-3 and A-4) containing 1 mole %, 3 mole % and 5 mole % of N-substituted pyridinium groups, respectively, and which had been untreated and had been recovered after treatment for 14, 28, 42, 56 and 70 days, respectively.

TABLE 2

| Sample No. | Content of N-substituted pyridinium groups (mole %) | Viscosity-average molecular weight Number of days of immersion treatment | | | | | |
| --- | --- | --- | --- | --- | --- | --- | --- |
|  |  | 0 | 14 | 28 | 42 | 56 | 70 |
| A-1 | 0 | 95000 | 95000 | 90000 | 95000 | 95000 | 95000 |
| A-2 | 1 | 79000 | 69000 | 59000 | 54000 | 45000 | 32000 |
| A-3 | 3 | 74000 | 45000 | 32000 | 24000 | 20000 | 17000 |

TABLE 2-continued

| Sample No. | Content of N-substituted pyridinium groups (mole %) | Viscosity-average molecular weight Number of days of immersion treatment | | | | | |
|---|---|---|---|---|---|---|---|
| | | 0 | 14 | 28 | 42 | 56 | 70 |
| A-4 | 5 | 64000 | 40000 | 24000 | 17000 | 17000 | 17000 |

In Table 2, the molecular weight of the methyl methacrylate homopolymer free of introduced N-substituted pyridinium groups remained substantially unchanged even 70 days later whereas, in the case of the polymer with 1 mole % of introduced N-substituted pyridinium groups, it is observed that the molecular weight dropped from 79000 to 32000 seventy days later. Incidentally, even in the case of the sheet of the polymer with 1 mole % of introduced N-substituted pyridinium groups, the transparency was substantially lost after the treatment for 28 days and the sheet treated for 70 days was easily broken when folded once over 180°.

A similar activated sludge treatment experiment was conducted with respect to styrene polymers (Sample Nos. B-2, B-3 and B-4) which contained N-substituted pyridinium groups. The molecular weight of styrene homopolymer (Sample No. B-1) employed in the experiment was 140,000. This molecular weight did not change at all even 70 days later. The molecular weights of styrene polymers (Sample Nos. B-2, B-3 and B-4) containing 1, 3 and 5 mole % of N-benzylpyridinium chloride, respectively, were however observed to drop from 234,000, 315,000 and 134,000 to 201,000, 248,000 and 105,000, respectively, after treatment with activated sludge for 70 days. Although not so marked as in the case of the methyl methacrylate polymers, it was also observed that the biodegradability of styrene polymers can be improved by the introduction of N-substituted pyridinium groups.

EXAMPLE 2

A 3-l separable flask was charged with 2100 g of distilled water, 1.5 g of ammonium persulfate, 2.25 g of ammonium sulfite, 1.8 g of sulfuric acid and 1.5 g of a 30 ppm aqueous solution of ferrous sulfate. Under continuous stirring at 50° C., 159 g (3 moles) of acrylonitrile and 3.3 g (0.031 mole) of 4-vinylpyridine were added dropwise over about 10 minutes. After completion of the dropwise addition, polymerization was conducted for 30 minutes to obtain a polymer slurry. Water was removed from the polymer slurry, followed by washing. After this procedure was repeated twice, the polymerization product was dried so that about 134 g of an acrylonitrile copolymer was obtained.

The acrylonitrile copolymer so obtained was next dissolved at the concentration of about 10 wt. % in dimethylformamide. Benzyl bromide, in an amount equimolar to the copolymerized 4-vinylpyridine, was then added to the resulting solution. They were reacted at 70° C. for 4 hours under stirring in a nitrogen gas atmosphere, whereby benzylation was effected. Ethanol was added to the reaction mixture to re-precipitate the copolymer so benzylated. The resultant precipitate was washed so that the target copolymer was obtained.

In a similar manner, acrylonitrile copolymers containing 4-vinylpyridine at 2 mole % and 3 mole %, respectively, were synthesized and were then benzylated with benzyl bromide in amounts equimolar to the contents of 4-vinylpyridine.

Those benzylated acrylonitrile copolymers were dissolved in dimethylacetamide to obtain 20 wt. % polymer solutions, respectively. Each of the polymer solutions was cast on a glass plate and then immersed in a great deal of water. Accordingly, they were formed into sheets of 1 cm in width, 2 cm in length and 0.5 mm in thickness, respectively. To investigate their biodegradability, they were immersed in the activated sludge aeration tank of the sewage treatment plant in accordance with the schedule shown in Table 3.

To determine the biodegradability of the copolymers in terms of the degree of a reduction in molecular weight, the intrinsic viscosities [$\eta$] of the immersed sheets were measured at 25° C. in dimethylformamide and their viscosity-average molecular weights were then determined in accordance with the following formula:

$$\text{Viscosity-average molecular weight } M = \left[\frac{[\eta]}{K}\right]^{1/a}$$

where $K = 3.35 \times 10^{-4}$ and $a = 0.72$ were used as constants.

Table 3 shows the viscosity-average molecular weights of sheets, which had been made from the copolymers (Sample Nos. C-1, C-2 and C-3) containing 1 mole %, 2 mole % and 3 mole % of benzylpyridinium groups, respectively, and which had been untreated and had been recovered after treatment for the days specified in Table 3, respectively.

TABLE 3

| Sample No. | Content of N-substituted pyridinium groups (mole %) | Viscosity-average molecular weight (before treatment) | Number of days of immersion treatment (days) | Viscosity-average molecular weight (after treatment) | Weight loss after treatment (%) |
|---|---|---|---|---|---|
| C-1 | 1 | $1.06 \times 10^5$ | 56 | $8.42 \times 10^4$ | 6 |
| C-2 | 2 | $9.64 \times 10^4$ | 63 | $7.60 \times 10^4$ | 6 |
| C-3 | 3 | $6.03 \times 10^4$ | 35 | $5.09 \times 10^4$ | 6 |

EXAMPLE 3

A copolymer composed of 80 mole % of styrene, 10 mole % of methyl acrylate and 10 mole % of 4-vinylpyridine was synthesized by a radical polymerization process. The copolymer was then reacted with benzyl chloride in an amount equimolar to the vinylpyridine, whereby a styrene copolymer containing N-substituted pyridinium groups was synthesized. The styrene copolymer was formed into a sheet of about 0.5 mm in thickness by a casting method and then immersed in the activated sludge aeration tank of the sewage treatment plant to conduct a biodegradability test. The intrinsic viscosity of the styrene polymer was 0.549 before the treatment. When it was immersed for 12 weeks, the intrinsic viscosity dropped to 0.508 and the weight was also reduced by 8%. Incidentally, the intrinsic viscosities were each measured at 30° C. in a 2:1 (by weight) mixed solvent of toluene and methanol.

EXAMPLE 4

Following a radical polymerization process, each copolymer sample was synthesized by using methyl acrylate and 4-vinylpyridine at such a ratio as giving the corresponding content of N-substituted pyridinium groups. The copolymer sample was then reacted with benzyl chloride in an amount equimolar to the 4-vinylpyridine, pyridine, and the copolymer sample so reacted was then subjected to hydrolysis under alkaline conditions to synthesize sodium polyacrylate. Results of a biodegradability test are presented in Table 4.

TABLE 4

| Sample No. | Content of N-substituted pyridinium groups (mole %) | $BOD_5$ (ppm) | TOC (ppm) | $BOD_5/TOC$ |
| --- | --- | --- | --- | --- |
| D-1 | 0 | 22.9 | 41.0 | 0.559 |
| D-2 | 1 | 42.2 | 43.9 | 0.961 |
| D-3 | 2 | 35.1 | 43.7 | 0 822 |
| D-4 | 3 | 34.3 | 42.5 | 0.807 |

$BOD_5$: Biochemical oxygen demand determined according to the method specified in the JIS (Japanese Industrial Standard).
TOC: Total organic carbon.

What is claimed is:

1. In a biodegradable polymer composed predominantly of acrylonitrile monomers, the improvement wherein the backbone of said biodegradable polymer comprises 1-5 mole %, based on the total moles of monomer in said biodegradable polymer, of a second monomer comprising a vinyl group substituted with one member selected from the group consisting of N-alkylpyridinium groups, N-arylpyridinium groups and N-arylalkylpyridinium groups.

2. The biodegradable polymer according to claim 1, wherein said biodegradable polymer has been obtained by quaternizing, into N-substituted pyridinium groups, pyridyl groups of polyacrylonitrile which was produced by bulk, suspension, solution or emulsion polymerization of an acrylonitrile monomer with 2-vinylpyridine or 4-vinylpyridine in the presence of a radical polymerization initiator, ion polymerization initiator or organometal compound.

3. The biodegradable polymer according to claim 1, wherein said biodegradable polymer has been obtained by subjecting a vinyl monomer, which is represented by the following formula [3]:

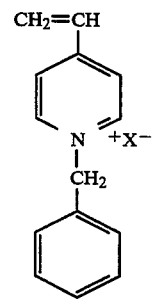

[3]

wherein $X^-$ represents a chlorine or bromine ion or a nitrate, nitrite, phosphate, sulfate, sulfite or sulfonate anion, and an acrylonitrile monomer to bulk, suspension, solution or emulsion polymerization in the presence of a radical polymerization initiator, ion polymerization initiator or organometal compound.

4. The biodegradable polymer according to claim 1, wherein said second monomer is represented by the following formula:

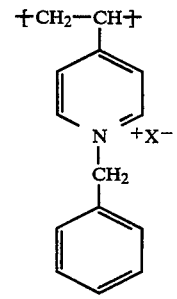

wherein $X^-$ represents a chlorine or bromine ion or a nitrate, nitrite, phosphate, sulfate, sulfite or sulfonate anion.

5. The biodegradable polymer according to claim 4, wherein $X^-$ is a chlorine ion.

* * * * *